US012290736B2

United States Patent
Rickert

(10) Patent No.: US 12,290,736 B2
(45) Date of Patent: May 6, 2025

(54) INPUT ASSEMBLIES FOR EXERCISE MACHINES AND METHODS OF ASSEMBLING INPUT ASSEMBLIES FOR EXERCISE MACHINES

(71) Applicant: Life Fitness, LLC, Franklin Park, IL (US)

(72) Inventor: Warren A. Rickert, Glen Ellyn, IL (US)

(73) Assignee: Life Fitness, LLC, Rosemont, IL (US)

( * ) Notice: Subject to any disclaimer, the term of this patent is extended or adjusted under 35 U.S.C. 154(b) by 221 days.

(21) Appl. No.: 18/112,115

(22) Filed: Feb. 21, 2023

(65) Prior Publication Data

US 2024/0278105 A1 Aug. 22, 2024

(51) Int. Cl.
*A63B 71/06* (2006.01)
*A63B 24/00* (2006.01)
*G06F 3/02* (2006.01)

(52) U.S. Cl.
CPC .......... *A63B 71/06* (2013.01); *A63B 24/0087* (2013.01); *G06F 3/0202* (2013.01); *A63B 2071/0675* (2013.01)

(58) Field of Classification Search
CPC . A63B 22/02; A63B 22/0235; A63B 22/0242; A63B 22/0285; A63B 22/0605; A63B 24/0006; A63B 24/0087; A63B 71/06; A63B 2022/0652; A63B 2024/0009; A63B 2024/0078; A63B 2071/06785; A63B 2225/30; G06F 3/0202; H01H 9/04; H01H 9/047; H01H 25/041
See application file for complete search history.

(56) References Cited

U.S. PATENT DOCUMENTS

| | | | |
|---|---|---|---|
| 6,078,792 A * | 6/2000 | Phillips | H04M 1/18 455/575.1 |
| 6,572,512 B2 | 6/2003 | Anderson et al. | |
| 7,846,070 B2 | 12/2010 | Oglesby et al. | |
| 8,823,393 B2 | 9/2014 | Aubauer et al. | |
| 9,238,158 B2 | 1/2016 | Strommen | |
| 9,254,416 B2 | 2/2016 | Ashby | |

(Continued)

FOREIGN PATENT DOCUMENTS

| | | |
|---|---|---|
| CN | 2592215 Y | 12/2003 |
| CN | 203971291 U | 12/2014 |

(Continued)

OTHER PUBLICATIONS

Capacitive touch fitness equipment for PaceMaster: Capacitive Touch in a Fitness equipment. Blue Sparq. 2016. Accessed at https://www.bluesparq.com/exercise-touch-panel-consumer.html on Sep. 11, 2020.

(Continued)

*Primary Examiner* — Mihir K Rayan
(74) *Attorney, Agent, or Firm* — Andrus Intellectual Property Law, LLP

(57) ABSTRACT

An input assembly is for an exercise machine. The input assembly has a housing having a keypad window, an insert in the housing, and a keypad in the keypad window, the keypad being sandwiched between the housing and the insert such that a seal is formed there between, the seal being configured to prevent ingress of liquid to the housing via the keypad window.

23 Claims, 9 Drawing Sheets

(56) References Cited

U.S. PATENT DOCUMENTS

| | | |
|---|---|---|
| 9,586,090 B2 | 3/2017 | Watterson et al. |
| 9,646,781 B1 | 5/2017 | Gluchman, Jr. et al. |
| 10,797,276 B2 | 10/2020 | Moomaw et al. |
| 2003/0071784 A1 | 4/2003 | Sato et al. |
| 2008/0242511 A1 | 10/2008 | Munoz et al. |
| 2010/0022354 A1* | 1/2010 | Fisher ............ A63B 71/0622 482/8 |
| 2011/0071003 A1 | 3/2011 | Watterson et al. |
| 2012/0111711 A1* | 5/2012 | Cho ................ H04M 1/18 200/5 A |
| 2013/0172153 A1 | 7/2013 | Watterson et al. |
| 2014/0185234 A1* | 7/2014 | Lee ................ H04M 1/0249 361/679.56 |
| 2016/0059071 A1 | 3/2016 | Kolman et al. |
| 2018/0140903 A1 | 5/2018 | Poure et al. |
| 2019/0192906 A1 | 6/2019 | Smith |
| 2020/0254311 A1 | 8/2020 | Watterson et al. |
| 2021/0283465 A1 | 9/2021 | Arceta et al. |

FOREIGN PATENT DOCUMENTS

| | | |
|---|---|---|
| CN | 106971884 | 7/2017 |
| CN | 107887210 | 4/2018 |
| EP | 1086721 | 8/2005 |
| KR | 102245601 | 4/2021 |
| TW | M362021 U | 8/2009 |
| WO | 2019143488 | 7/2019 |

OTHER PUBLICATIONS

Vision Treadmills Console Manual Rev. 1.4 (English), 2013 Vision Fitness.

Wheel Capacitive Touch Sensor BMS00030. Best Modules. Accessed at https://www.bestmodulescorp.com/bms00030.html on Sep. 11, 2020.

Inventor's Declaration of Prior Art.

Extended European Search Report issued in Corresponding EP Application No. 24157525.7, on Jun. 19, 2024.

\* cited by examiner

INPUT ASSEMBLIES FOR EXERCISE MACHINES AND METHODS OF ASSEMBLING INPUT ASSEMBLIES FOR EXERCISE MACHINES

FIELD

The present disclosure relates to exercise machines, and more particularly to input assemblies for exercise machines and methods of assembling input assemblies for exercise machines.

BACKGROUND

The following U.S. patents are incorporated herein by reference.

U.S. Pat. No. 9,646,781 discloses a push button encoder that comprises a push button, a base that supports the push button, and a printed circuit board. Pushing the push button engages the printed circuit board and thereby causes the printed circuit board to output an electrical signal. A spring resiliently supports the printed circuit board with respect to the base such that the printed circuit board is movable with respect to the base when the push button is pushed U.S. Pat. Appl. Pub. No. 2008/0242511 discloses user interface methods and apparatuses for controlling exercise apparatuses. An example user interface includes an exercise parameter input and an indicator associated with the exercise parameter input, and a control unit to activate the indicator in response to a training routine to prompt a user of the exercise apparatus to adjust an operation of the exercise apparatus via the exercise parameter input U.S. Pat. Appl. Pub. No. 2021/0283465 discloses a fitness machine providing solid-state controls. The fitness machine includes a frame and a moving portion supported by the frame that moves relative to the frame. An adjustment device adjusts the movement of the moving portion. A console has a display for displaying information when the fitness machine is in use. An input device receives a user input movement for controlling the adjustment device. The input device includes a contact surface that detects a direction of the user input movement thereon, and the input device includes a movement simulating indicator that generates a display. A control system is coupled to the input device and the adjustment device. The control system controls the adjustment device based on the direction of the user input movement received by the input device. The control system causes the display of the movement simulating indicator to move in the direction of the user input movement.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In non-limiting examples disclosed herein, an input assembly is for an exercise machine. The input assembly has a housing having a keypad window, an insert in the housing, and a keypad in the keypad window, the keypad being sandwiched between the housing and the insert such that a seal is formed there between, the seal being configured to prevent ingress of liquid to the housing via the keypad window.

In non-limiting examples disclosed herein, the housing may comprise a first housing portion and a second housing portion which are ultra-sonically welded together along a seam. The housing may extend from an open end to a closed end and the seam may extend along opposite sides of the housing and along the closed end. Insertion of the insert into the housing may compress the keypad between the housing and the insert, thereby forming the seal. The housing may comprise a window frame extending around the keypad window, wherein the insert comprises a compression surface, and wherein insertion of the insert into the housing sandwiches the keypad between the compression surface and the window frame, thereby forming the seal.

The keypad may comprise a channel and the window frame may comprise a lip which is received in the channel upon insertion of the insert into the housing, thereby forming the seal. The lip may extend around a perimeter of the window frame and the channel may extend around a perimeter of the keypad.

A retainer device may be provided for retaining the insert in the housing. The retainer device may comprise a rib on the housing which snap engages with the insert upon insertion of the insert into the housing.

A guiding device may be provided for guiding the insert in a predetermined orientation in the housing upon insertion of the insert into the housing. The guiding device may comprise a protrusion on the insert which is received in a channel in the housing.

In non-limiting examples disclosed herein, a method of assembling an input assembly comprises providing a housing having an open end, a closed end, and a keypad window, inserting a keypad into the housing via the open end and aligning the keypad with the keypad window, and inserting an insert into the housing via the open end and thereby compressing the keypad against the housing, forming a seal there between which is configured to prevent ingress of liquid to the housing via the keypad window. The housing may be provided by ultrasonically welding a first housing portion and a second housing portion together along a seam.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

The present inventor has identified problems with fitness or exercise machines presently known in the art, and particularly with input devices used to control the operation of such exercise machines. Known input devices used to control exercise machines include but are not limited to push-button switches, sliding switches, selector switches (e.g., rotary knobs or levers having multiple positions), paddles (e.g., limit switches), and/or other switch mechanisms. In the example of a stationary bicycle, input devices are conventionally used to adjust the resistance of one or more wheels and/or toggle electronic exercise settings. Other uses of input devices for exercise machines include those for adjusting the resistance, incline, and/or stride length of a rowing device, treadmill, stair climber, upright or recumbent stationary bicycles, or elliptical machine, for example. It should be recognized that these are merely examples and that other features of exercise machines known in the art may also be adjustable by input devices.

The present inventor has recognized that, particularly for exercise machines, input devices tend to break or otherwise fail and in particular are susceptible to liquid (e.g. beverages, cleaning substances, water and/or sweat) ingress during operation as a result of high use and/or operation while the user is in motion, such as biking. For instance, input devices known in the art often have moving parts, seams, and other joints and thus have an inherently limited lifespan. This is further exacerbated for input devices of exercise machines used within a commercial context (e.g., at a fitness center), which are exposed to greater usage and, consequently, wear and tear. Similarly, the inventor has identified that any ingress of water, sweat, and/or dirt may cause moving or abutting parts of the input devices (and/or any internal electrical components contained therein) to fail, thereby causing the input devices to malfunction. Replacing these input devices is typically expensive and requires installation by a technician rather than the owner of the exercise machine, adding further expense and longer downtime. Certain input devices may be combined with or embedded in other components (e.g., a panel of inseparable input devices) such that the failed input device may not be replaced without replacing the entire component.

Through experimentation and development, the present inventor has invented the presently disclosed novel input assemblies having input device(s) which solve or at least reduce the severity of the problems described above.

Figure 1:
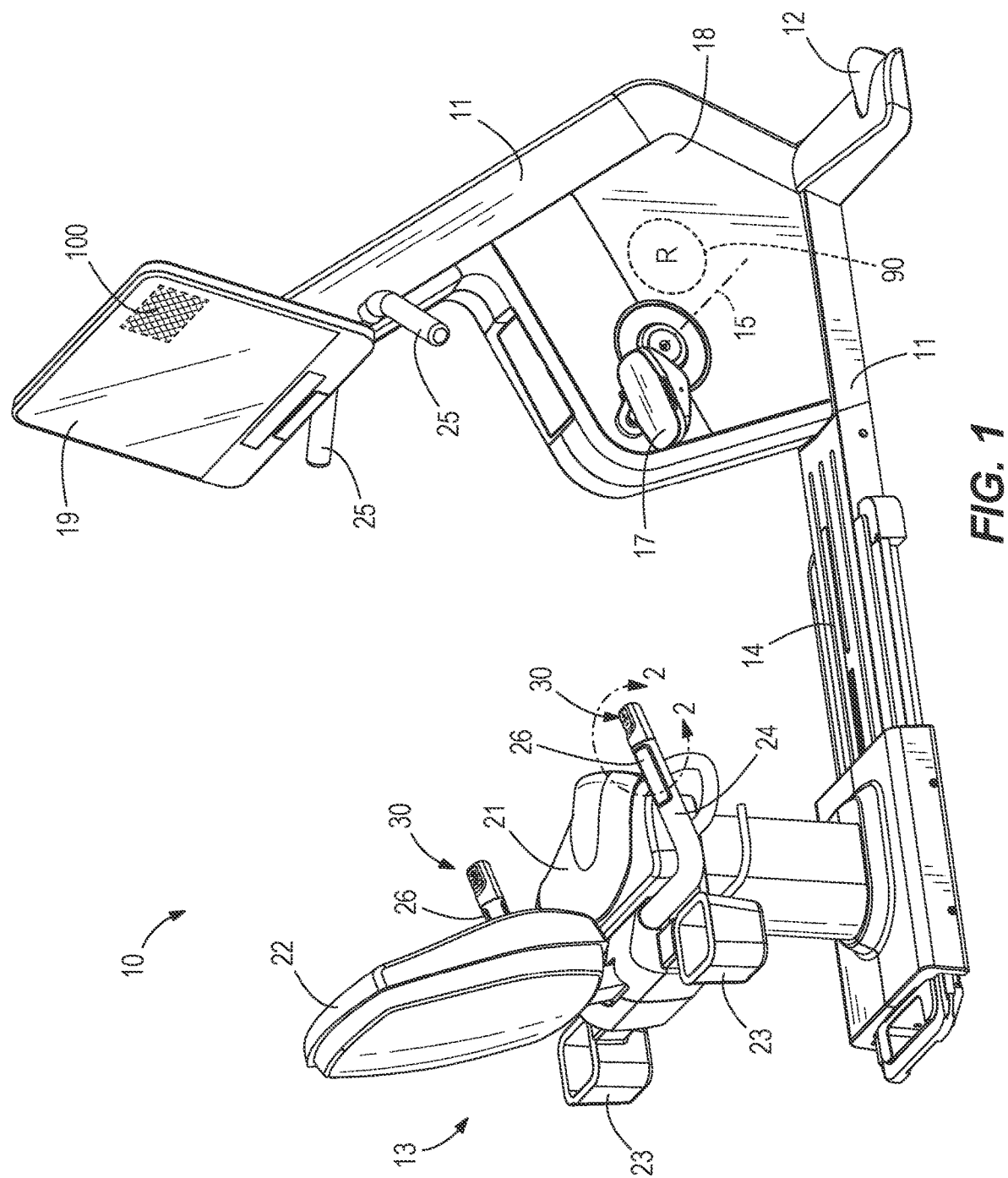
FIG. 1 is an isometric view of an example exercise machine incorporating example input assemblies according to the present disclosure.

FIG. 1 depicts an example exercise machine 10 comprising a stationary recumbent bicycle which is similar to those presently known in the art but which incorporates one or more input assemblies 30 according to the present disclosure. The exercise machine 10 has a frame 11 which supports other components of the exercise machine 10 (described hereinbelow) and which further supports a user. One or more ground-engaging wheels and/or feet 12 are coupled to the frame 11 and are configured to prevent tipping of the exercise machine 10. In use, the user sits on a seat assembly 13 which is selectively movable along a track 14 coupled to frame 11. The user can move the seat assembly 13 along the track 14 in a first direction towards foot pedals 17 or in a second direction away from the foot pedals 17. Optionally the seat assembly 13 may include a locking mechanism (not depicted) for locking the position of the seat assembly 13 relative to the track 14 and the foot pedals 17. A resistance device 90 is coupled to the foot pedals 17 and contained within a housing 18. The resistance device 90 is configured to resist movement of the pedals 17 about an axis 15. The resistance device 90 can for example include an Eddy brake or magnetic or frictional braking device and/or the like. The user can adjust the resistance device 90 via a display panel 19 or the input assemblies 30 to thereby vary the resistance applied by the resistance device 90 to the foot pedals 17. The display panel 19 may be a touchscreen display or LED display with mechanical and/or tactile push buttons.

The seat assembly 13 includes a seat bottom 21, a seat back 22, cup holders 23, and a pair of handles that are part of a handlebar 24. In use, the user can engage the handlebar 24 to thereby maintain their balance on the seat assembly 13. Auxiliary handles 25 are coupled to the frame 11 near the display panel 19 and are for assisting the user when they move onto or off of the seat assembly 13.

Each handlebar 24 or handle 25 can include one more sensors 26 (e.g., heartrate sensor and/or the like) that provide user feedback signals to a control system 100. Note that the control system 100 is schematically depicted as part of the display panel 19. The control system 100 processes the feedback signals to thereby display information to the user, customize the exercise program, and/or adjust the resistance generated by the resistance device.

The handlebar 24 also includes one or more novel input assemblies 30 configured according to the present disclosure, in particular to receive user inputs and generate input signals for communication to the control system 100. The control system 100 processes the input signals and displays information to the user, and/or customizes the exercise program, and/or adjusts the resistance generated by the resistance device. Note that in other examples, the auxiliary handles 25 may also include one or more sensors 26 and/or one or more input assemblies 30.

Figure 2:
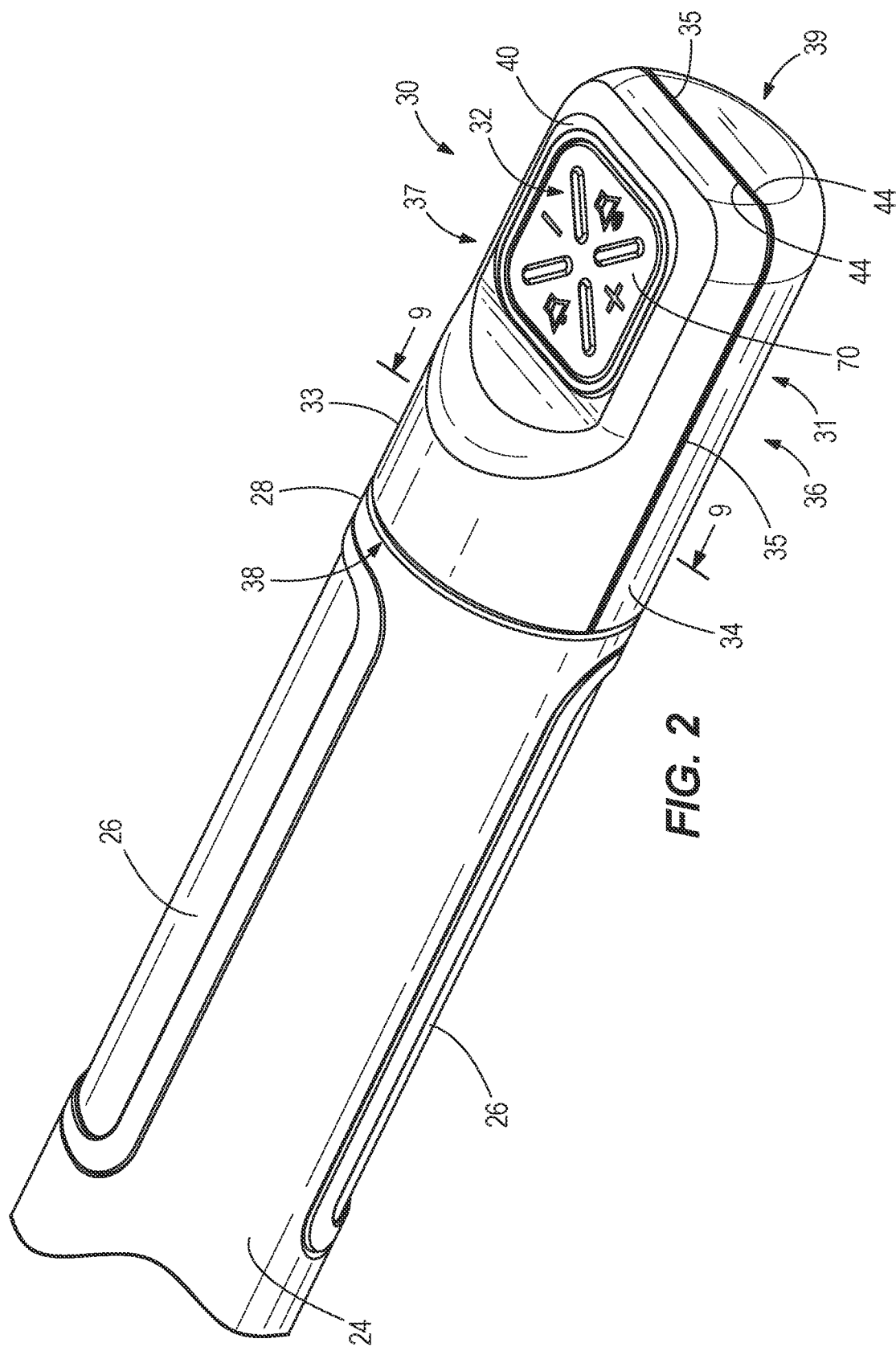
FIG. 2 is an enlarged isometric view of an example input assembly taken within line 2-2 on FIG. 1.

Turning now to FIG. 2, an example input assembly 30 of the present disclosure is depicted in greater detail. The input assembly 30 includes an open first end 38 (see also FIG. 3) and an closed second end 39 (see also FIG. 3) which is opposite the open first end 38. The input assembly 30 also includes a first side 36 and an opposite second side 37 which both extend between the ends 38, 39. A scam 35 extends along the sides 36, 37 and along the second end 39. The input assembly 30 is coupled to the handlebar 24 and has a housing 31 which defines a keypad window 32 in which an input device, such as a keypad 70, is positioned. A user of the exercise machine 10 can engage the keypad 70 to generate input signals (as noted above) that are sent to the control system 100 (FIG. 1). In the example depicted in FIG. 2, the keypad 70 includes a directional keypad which permits the user to change the volume of sounds generated by the exercise machine 10 (FIG. 1) and/or toggle between different items (e.g., soundtracks, exercise settings, resistance settings) of the exercise machine (FIG. 1).

Figure 3:
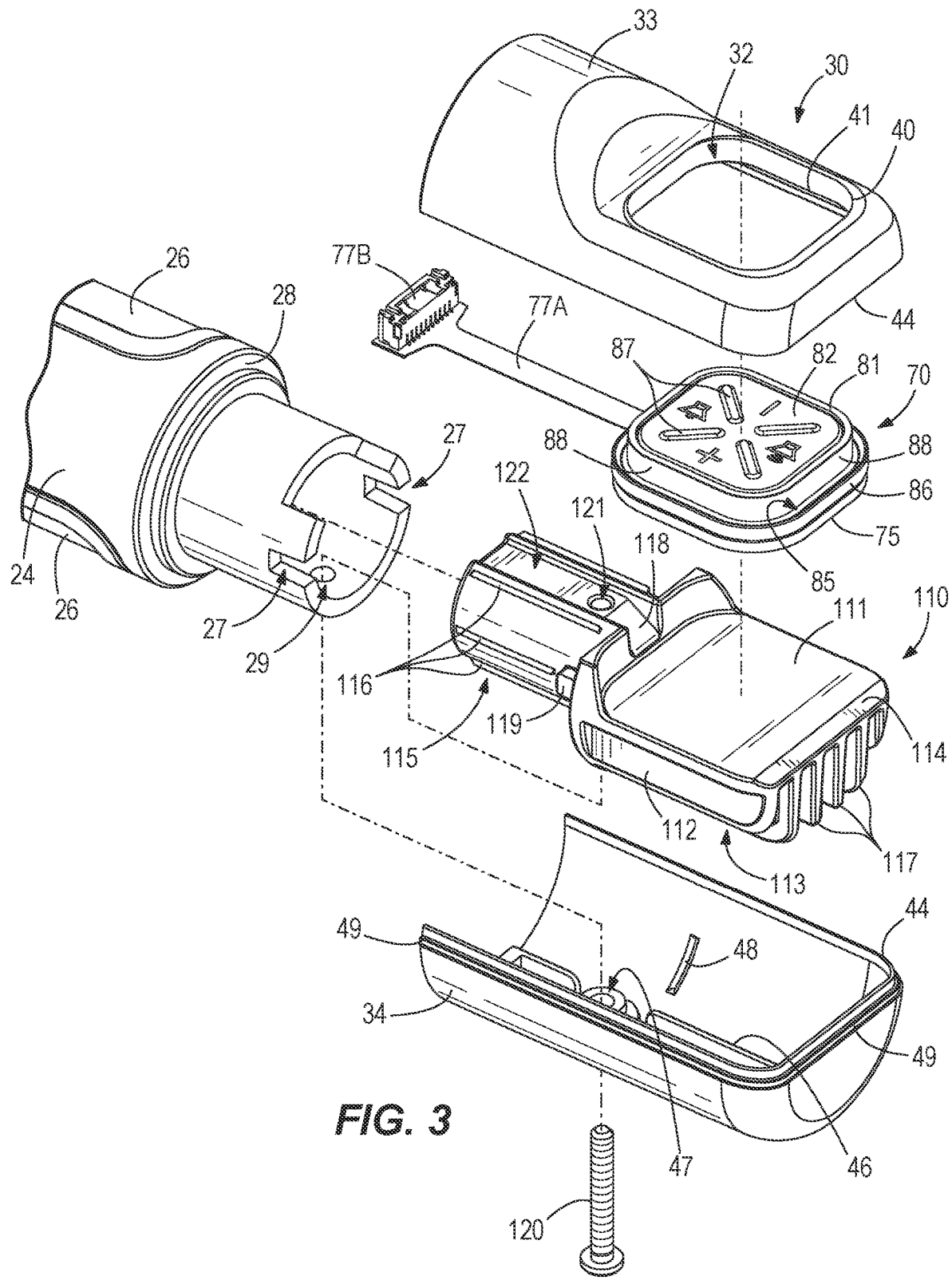
FIG. 3 is an exploded view of the input assembly of FIG. 2.

FIG. 3 is an exploded view of the input assembly 30 depicted in FIG. 2. The housing 31 of the input assembly 30 includes an upper first housing portion 33 and a lower second housing portion 34. The housing portions 33, 34 have perimeters 44 which are adjacent and/or abut one another to thereby form the seam 35 along the first and second sides 36, 37 and along the second end 39 (see also FIG. 2). Each perimeter 44 has a melting element 49 that protrudes outwardly from and extends the length of the perimeter 44 (note that the perimeter melting element 49 of the first housing portion 33 is not depicted). When first and second housing portions 33, 34 are brought together and ultrasonic energy is applied, the melting elements 49 of each first and second housing portion 33, 34 melt and fuse with each other to thereby create a fluid-tight seal between the first and second housing portions 33, 34. The first and second housing portions 33, 34 define a cavity 45 (FIG. 5) in which the keypad 70 and an insert 110 (both described in greater detail hereinbelow) are received. The second housing portion 34 includes a bore 47 and one or more longitudinally extending guiding devices 46 (e.g., protrusions, fins) that extend toward the first housing portion 33 (note that FIG. 3 depicts only one of the guiding devices 46). One or more retaining devices 48 (see FIGS. 3 and 5-6) (e.g. rib, curved triangular prism-shaped elastic tabs) are on the interior surfaces of the housing portions 33, 34.

Figure 4:
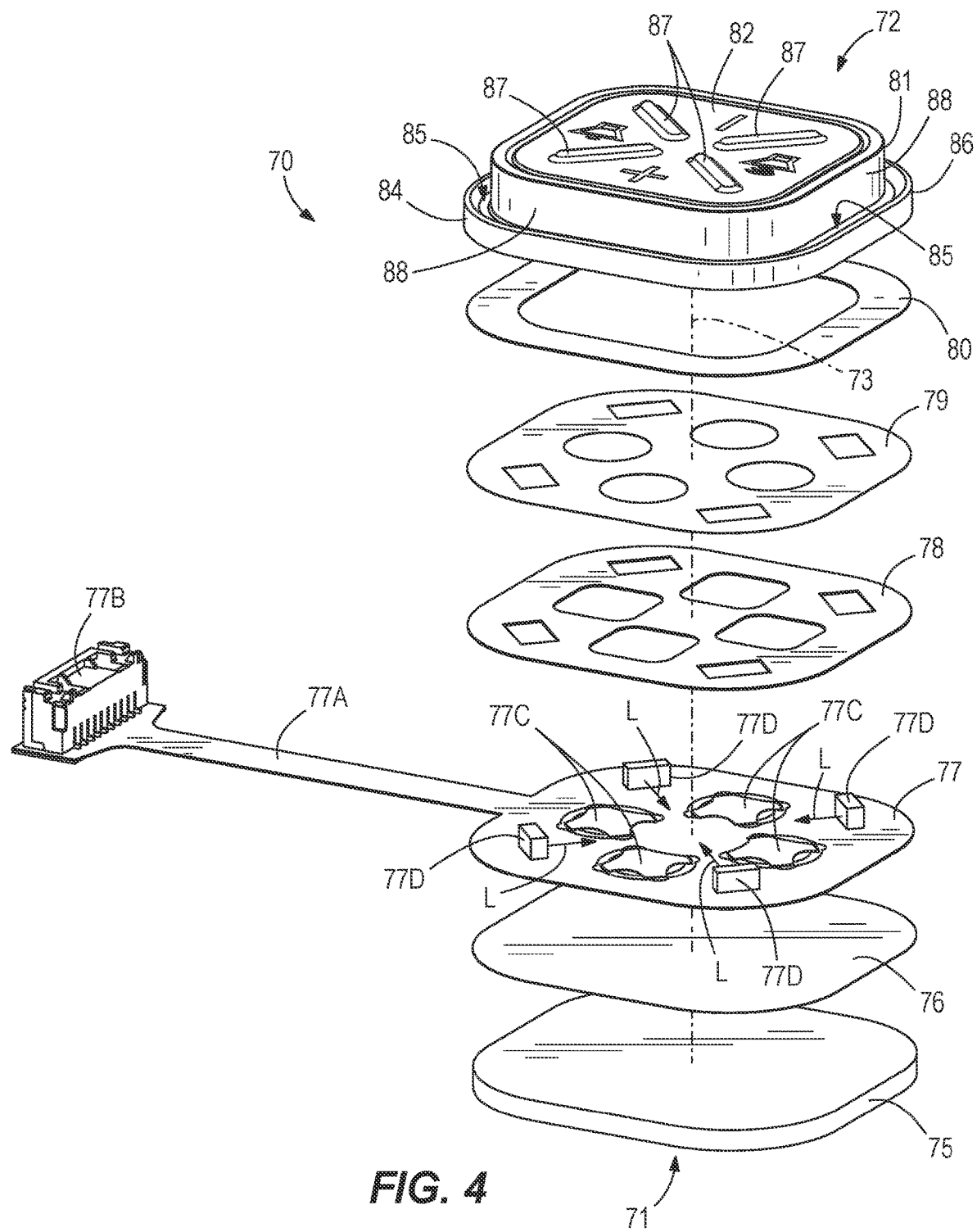
FIG. 4 is an exploded view of an example keypad according to the present disclosure.

The keypad 70 depicted in FIG. 3 is described herein below in greater detail with reference to FIG. 4. The keypad 70 includes multiple layers (described below) that are coupled together. The layers of the keypad 70 are described beginning at a lower first end 71 of the keypad 70 and progressing axially (see center axis 73) toward an opposite second end 72 of the keypad 70. A backer layer 75 is formed of a material (e.g., polycarbonate) that is rigid and that does not easily flex. An adhesive layer 76 is adhered to the upper surface of the backer layer 75, and a circuit layer 77 is laid on top of the adhesive layer 76. The circuit layer 77 includes printed electrical circuits and has a tail 77A with an electrical-mechanical connector 77B that connects to a circuit system (not depicted) of the exercise machine 10. The circuit layer 77 also includes one or more dome switches 77C and one or more light emitting diodes (LEDs) 77D. The LEDs 77D are oriented such that the light is directed inwardly toward the center of the circuit layer 77 (see arrows L that depict the direction the light from the LEDs 77D is directed). The present inventors discovered that the above-noted orientation of the LEDs 77D advantageously evenly distributes and diffuses the light from the LEDs 77D onto the inner surface of a silicone pad layer 81 (described further herein) without forming light "hot spots". A clear spacer layer 78 abuts the upper surface of the circuit layer 77 and is designed to permit activation of the dome switches 77C and hold the dome switches 77C in place on the circuit layer 77. A clear overlay layer 79 is placed onto the spacer layer 78 and is designed to further hold the dome switches 77C in place on the circuit layer 77. An adhesive ring layer 80 is placed onto the overlay layer 79. Finally, an optical silicone pad layer 81 is placed on top of the adhesive ring layer 80 such that all the layers noted above are coupled together to form a unitary keypad 70. In use, the user engages one or more sections of the upper surface 82 of the optical silicone pad layer 81 to thereby compress and activate one or more dome switches 77C. When each dome switch 77C is compressed, a corresponding signal is generated by the circuit layer 77 and communicated via the tail 77A and the connector 77B to the control system 100 (see FIG. 1) of the exercise machine 10 (FIG. 1).

The optical silicone pad layer 81 includes a perimeter 84 with a protruding lip 86 that axially extends away from the perimeter 84. A channel 85 is defined between the lip 86 and a sidewall 88 of the optical silicone pad layer 81. Note that the channel 85 extends along all sides of the optical silicone pad layer 81. The optical silicone pad layer 81 can further include projections 87 that extend from the upper surface 82 to thereby partition off different areas of the upper surface 82 from each other. In one non-limiting example, the optical silicone pad layer 81 is formed of clear silicone and the upper surface 82 is painted such that the indicia (e.g., a plus symbol, a speaker symbol) are visible to the operator. The upper surface 82 and/or the other exterior surfaces of the optical silicone pad layer 81 are painted black and the indicia are painted white. The now painted optical silicone pad layer 81 is then processed by a laser etching paint removal device that removes the paint from the optical silicone pad layer 81 at prescribed locations. For instance, the laser etching paint removal device may remove the paint along the perimeter of the optical silicone pad layer 81 and/or around the projections 87. With the paint removed, light from the LEDs 77D (noted above) shines through the clear optical silicone pad layer 81 at the location where the paint is removed by the laser etching paint removal device. After paint is removed by the laser etching paint removal device, the entire optical silicone pad layer 81 can be coated with a top coat that prevents the remaining paint from inadvertently coming off the optical silicone pad layer 81.

Figure 5:
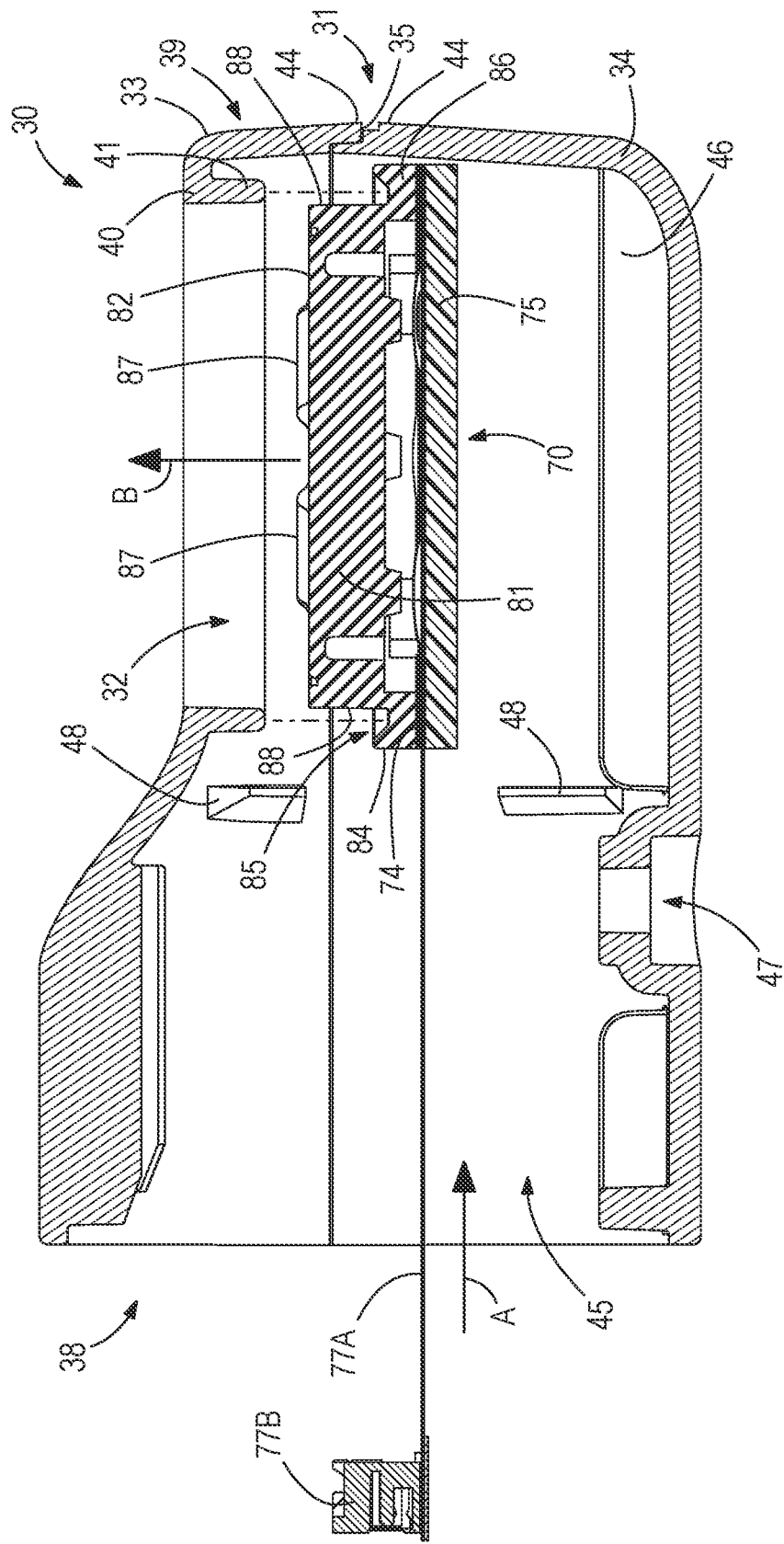
FIGS. 5-7 are cross-sectional views of an example input assembly depicting an example assembly sequence of the input assembly.

Referring back to FIG. 3, the input assembly 30 includes the insert 110 that is received into the cavity 45 (FIG. 5). The insert 110 sandwiches the keypad 70 between the first housing portion 33 and the insert 110 such that a fluid-tight seal is formed between the first housing portion 33 and the keypad 70 that prevents ingress of liquid through the keypad window 32 into the cavity 45 (FIG. 5). As such, the sensitive circuits of the keypad 70 are protected against damage and shorting which otherwise could be caused by liquid entering the cavity 45. The insert 110 includes a compression surface 111 that contacts the keypad 70 and an elongated body 112 having a front first body portion 113 and a rear second body portion 115. The compression surface 111 is on the first body portion 113, and one or more guiding devices 117 (e.g., protrusions, fins) extend away from the first body portion 113 in a direction away from the compression surface 111. The first body portion 113 also includes a ramp surface 114 configured to engage the keypad 70 and facilitate sliding of the front first body portion 113 under the keypad 70 upon insertion of the insert 110 into the cavity 45 (FIG. 5). The second body portion 115 includes a plurality crush ribs 116 that are configured to crush when the handle bar assembly 30 is coupled to the handlebar 24 (see FIGS. 8-9). The second body portion 115 also includes one or more bores 121 and one or more clocking devices 119, e.g., protruding tabs (these features are described further herein).

Figure 6:
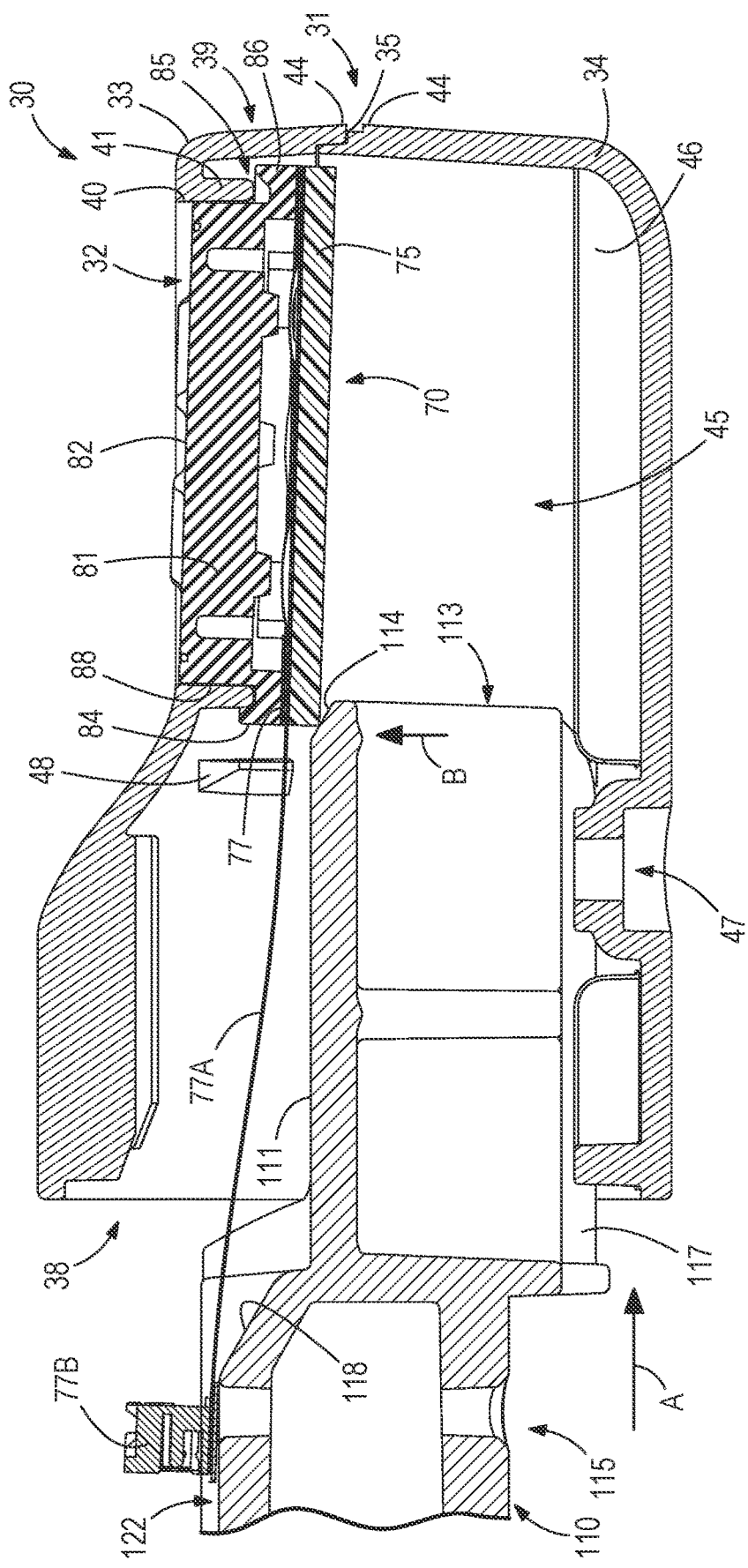
Figure 7:
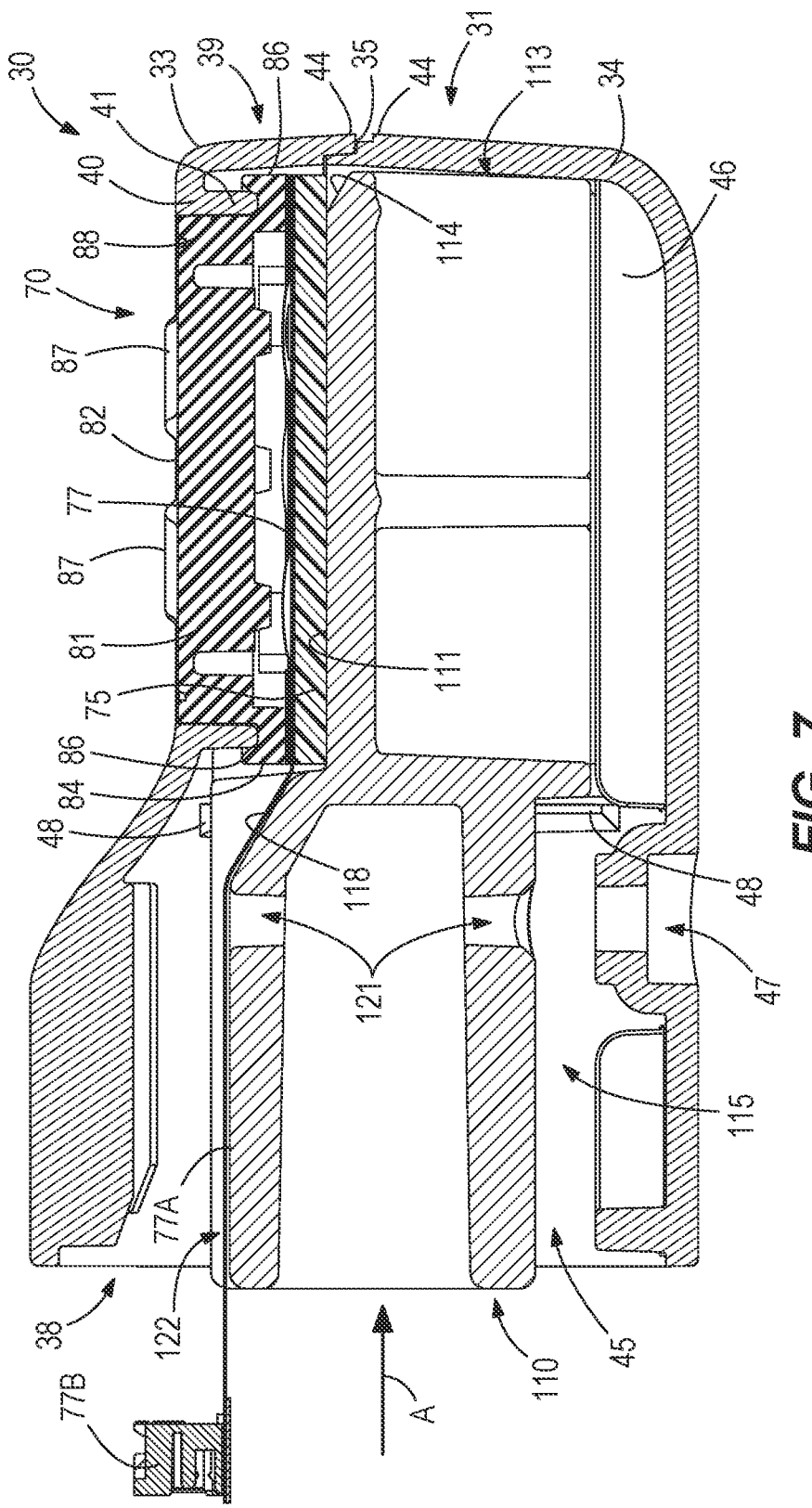

FIGS. 5-7 depict an example sequence for assembling the input assembly 30. FIG. 5 depicts the housing portions 33, 34 coupled together such that the perimeter edges 44 are adjacent each other and the fluid-tight seam 35 extends along the sides 36, 37 and the second end 39 (FIG. 2). The keypad 70 is inserted into the cavity 45 (see arrow A indicating the direction the keypad 70 is inserted into the cavity 45) such that the tail 77A extends through the cavity 45 and the electric-mechanical connector 77B is outside the cavity 45. The keypad 70 is further moved into the keypad window 32 (see arrow B indicating the direction the keypad 70 is moved into the keypad window 32) into a position similar to the position depicted in FIG. 6. In certain examples, the sidewalls 88 frictionally engage with the frame 40 such that the keypad 70 is frictionally held in the keypad window 32 while the user inserts the insert 110 (described below).

FIG. 6 depicts the insert 110 partially inserted into the cavity 45 (see arrow A). The mechanical connector 77B rests on the second body portion 115 of the insert 110 and the ramp surface 114 engages and pushes the keypad 70 toward the keypad window 32 (see arrow B). The ramp surface 114 also prevents the insert 110 from pushing the keypad 70 toward the second end 39 of the housing 31. As the ramp surface 114 engages the keypad 70, the lip 41 of the window frame 40 is received into the channel 85 defined along the perimeter 84 of the keypad 70 such that the seal between the window frame 40 and the keypad 70 begins to form. Note that FIG. 6 depicts the guiding devices 117 of the insert 110 sliding along the guiding devices 46 of the second housing portion 34 such that the guiding devices 117, 46 together guide the insert 110 into a proper position within the cavity 45.

Referring to FIG. 7, the insert 110 is depicted fully inserted into the cavity 45. As the insert 110 is moved from the partially inserted position depicted in FIG. 6 to the fully inserted position depicted in FIG. 7, the compression surface 111 slides along the lower end 71 (FIG. 4) of the keypad 70 such that the insert 110 compresses the keypad 70 onto the first housing portion 33 to thereby form the seal between the keypad 70 and the first housing portion 33. That is, the lip 41 of the window frame 40 is fully received into the channel 85 of the keypad 70 such that the fluid-tight seal is formed and the first body portion 113 is adjacent to the second end 39 of the housing 31. As insert 110 is moved into to position depicted in FIG. 7, the first body portion 113 elastically deforms/compresses the retaining devices 48 until the first body portion 113 clears the retaining devices 48. The retaining devices 48 then move back to their original orientation (e.g., the retaining tabs 48 "snap" back) thereby retaining the insert 110 in the housing 31. The bores 121 of the second body portion 115 align with the bore 47 in the second housing portions 34. The tail 77A extends along the second body portion 115. Note that the second body portion 115 has a transition surface 118 along which the tail 77A extends such that the tail 77A is not subjected to an edge that could otherwise damage the circuitry in the tail 77A. The second body portion 115 includes an elongated recess 122 in which the tail 77A lies.

Figure 8:
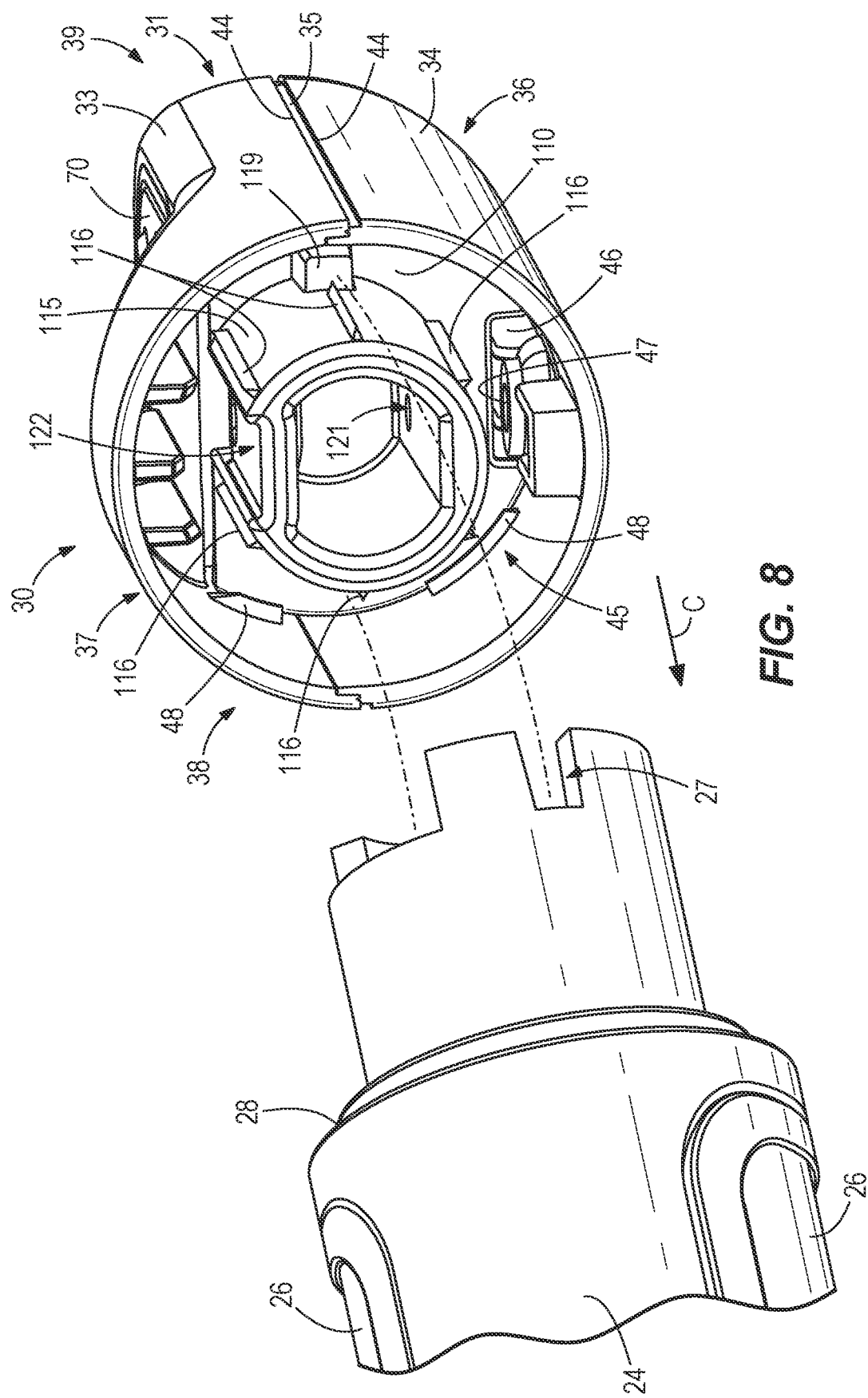
FIG. 8 is an exploded view of an example input assembly decoupled from a handlebar.
Figure 9:
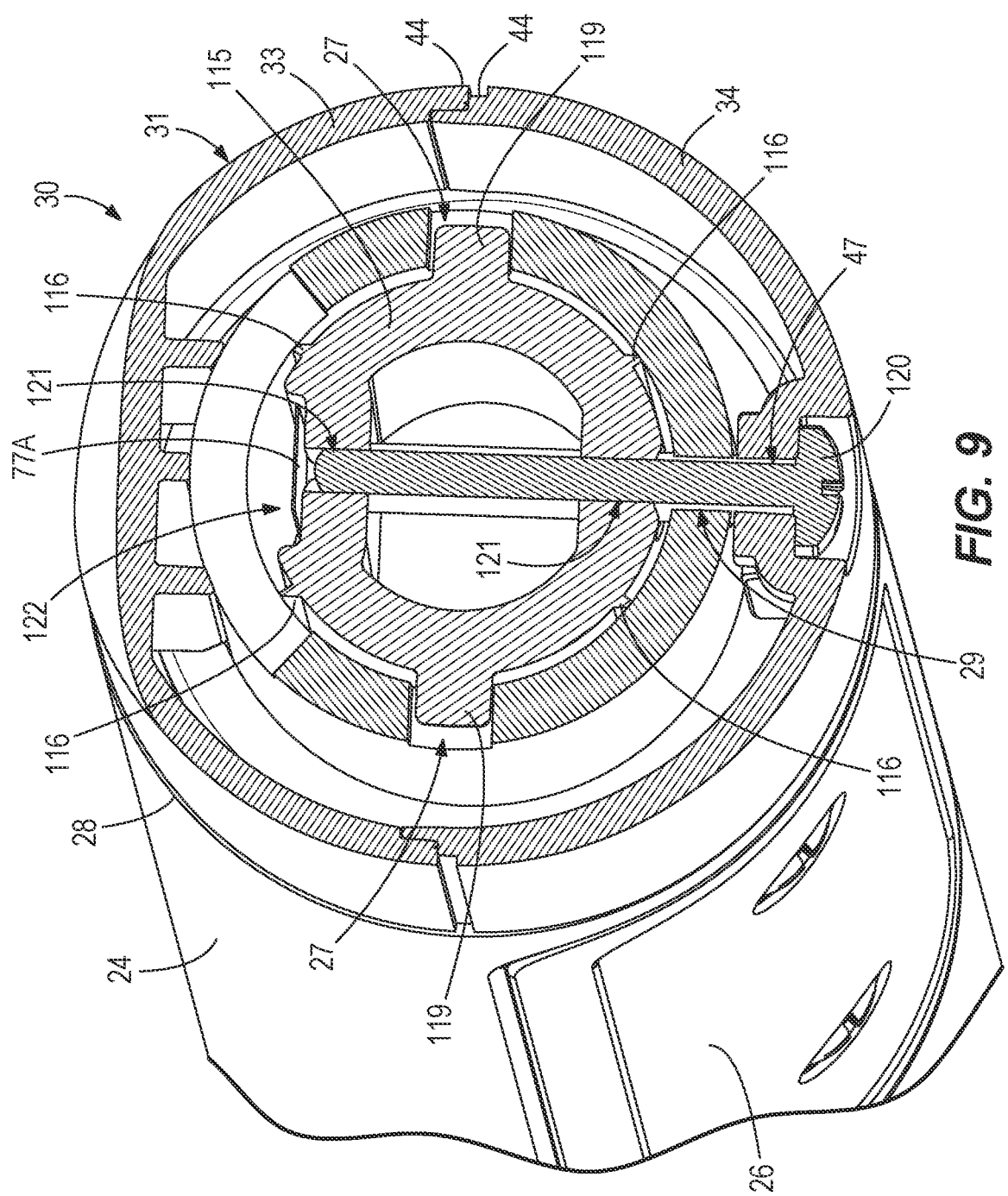
FIG. 9 is a cross-sectional view of the example input assembly of FIG. 2 along line 9-9 of FIG. 2.

After the input assembly 30 is assembled (as described above with respect to FIGS. 5-7), the input assembly 30 is coupled to the end of the handlebar 24 or handle. FIG. 8 depicts the input assembly 30 disconnected from the handlebar 24 (see also FIG. 3 that depicts the components of the handlebar 24). Before coupling the input assembly 30 to the handlebar 24, the clocking devices 119 are aligned with slots 27 in the handlebar 24 such that the input assembly 30 is in a proper orientation relative to the handlebar 24. The input assembly 30 is then pushed (see arrow C) onto the handlebar 24 such that the clocking devices 119 are in the slots 27 and the open end 38 of the input assembly 30 abuts or is adjacent to a corresponding edge 28 of the handlebar 24. As noted above, the crush ribs 116 crush and frictionally engage the handlebar 24. To secure input assembly 30 to the handlebar 24 (see FIG. 8), a fastener 120, e.g., screw, is inserted through the bore 47 in the second housing portion 34, a hole 29 in the end of the handlebar 24, and the bores 121 of the insert 110.

It will thus be understood by those having ordinary skill in the art that, in certain examples, the present disclosure provides a novel input assembly for an exercise machine having a housing having a keypad window, an insert in the housing, and a keypad in the keypad window. The keypad is sandwiched between the housing and the insert such that a seal is formed there between and the seal being configured to prevent ingress of liquid to the housing via the keypad window. Optionally, the housing comprises a first housing portion and a second housing portion which are ultrasonically welded together along a seam. Optionally, the housing extends from an open end to a closed end and a seam extends along opposite sides of the housing and along the closed end. Optionally, the housing extends from an open end to a closed end and insertion of the insert into the housing compresses the keypad between the housing and the insert thereby forming the seal. Optionally, the housing comprises a window frame extending around the keypad window, the insert comprises a compression surface, and insertion of the insert into the housing sandwiches the keypad between the compression surface and the window frame thereby forming the seal. Optionally, the keypad comprises a channel and the window frame comprises a lip which is received in the channel upon insertion of the insert into the housing thereby forming the seal. Optionally, the lip extends around a perimeter of the window frame and wherein the channel extends around a perimeter of the keypad.

Optionally, a retainer device retains the insert in the housing. Optionally, the retainer device comprises a rib on the housing which snap engages with the insert upon insertion of the insert into the housing. Optionally, a guiding device guides the insert into a predetermined orientation in the housing upon insertion of the insert into the housing. Optionally, the guiding device comprises a protrusion on the insert which interacts with a guiding device in the housing. Optionally, the insert comprises an elongated body having a first body portion and a second body portion and the compression surface is on the first body portion. Optionally, a ramp surface is on the first body portion and the ramp surface is configured to engage the keypad and facilitate sliding of the first body portion under the keypad upon insertion of the insert into the housing. Optionally, a handlebar is included and plurality of crush ribs on a second body portion are configured to crush when the input assembly is coupled to the handlebar thereby frictionally engaging the input assembly with the handlebar. Optionally, a handlebar is included and the housing is fastened to an end of the handlebar by a fastener which extends through the housing and the insert.

In certain examples, a method of assembling an input assembly includes providing a housing having an open end, a closed end, and a keypad window; inserting a keypad into the housing via the open end and aligning the keypad with the keypad window; and inserting an insert into the housing via the open end thereby compressing the keypad against the housing and forming a seal there between which is configured to prevent ingress of liquid to the housing via the keypad window. Optionally, the method includes providing the housing by ultrasonically welding a first housing portion and a second housing portion together along a seam. Optionally, insertion of the insert into the housing sandwiches the keypad between a compression surface of the insert and a window frame of the housing, thereby forming the seal. Optionally, the insert snap engages with the housing upon insertion into the housing. Optionally, the insert is rotationally locked into a predetermined orientation in the housing upon insertion into the housing.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An input assembly for an exercise machine, the input assembly comprising:
   a housing having a keypad window;
   an insert in the housing; and
   a keypad in the keypad window, the keypad being sandwiched between the housing and the insert such that a seal is formed there between, said seal being configured to prevent ingress of liquid to the housing via the keypad window, wherein the housing extends from an open end to a closed end and a seam extends along opposite sides of the housing and along the closed end.

2. The input assembly according to claim 1, wherein the housing provides a handlebar extending between the open end and the closed end and through which the keypad window is formed.

3. An input assembly for an exercise machine, the input assembly comprising:
   a housing having a keypad window;
   an insert in the housing; and
   a keypad in the keypad window, the keypad being sandwiched between the housing and the insert such that a seal is formed there between, said seal being configured to prevent ingress of liquid to the housing via the keypad window, wherein the housing extends from an open end to a closed end and further wherein insertion of the insert into the housing compresses the keypad between the housing and the insert, thereby forming the seal.

4. The input assembly according to claim 3, wherein the housing comprises a first housing portion and a second housing portion which are ultra-sonically welded together along a seam.

5. The input assembly according to claim 3, wherein the housing provides a handlebar extending between the open end and the closed end and through which the keypad window is formed.

6. A method of assembling an input assembly, the method comprising:
   providing a housing that extends from an open end to a closed end and has a keypad window there between;
   inserting a keypad into the housing via the open end and aligning the keypad with the keypad window; and
   inserting an insert into the housing via the open end thereby compressing the keypad against the housing and forming a seal there between which is configured to prevent ingress of liquid to the housing via the keypad window.

7. The method according to claim 6, further comprising providing the housing by ultrasonically welding a first housing portion and a second housing portion together along a seam.

8. The method according to claim 6, wherein insertion of the insert into the housing sandwiches the keypad between a compression surface of the insert and a window frame of the housing, thereby forming the seal.

9. The method according to claim 6, wherein the insert snap engages with the housing upon insertion into the housing.

10. The method according to claim 6, wherein the insert is rotationally locked into a predetermined orientation in the housing upon insertion into the housing.

11. The method according to claim 6, wherein the housing provides a handlebar extending between the open end and the closed end and through which the keypad window is formed.

12. An input assembly for an exercise machine, the input assembly comprising:
   a housing having a keypad window;
   an insert in the housing; and
   a keypad in the keypad window, the keypad being sandwiched between the housing and the insert such that a seal is formed there between, said seal being configured to prevent ingress of liquid to the housing via the keypad window;
   wherein the housing extends from an open end to a closed end and comprises a window frame extending around the keypad window;
   wherein the insert comprises a compression surface; and
   wherein insertion of the insert into the open end sandwiches the keypad between the compression surface and the window frame, thereby forming the seal.

13. The input assembly according to claim 12, wherein the keypad comprises a channel and the window frame comprises a lip which is received in the channel upon insertion of the insert into the housing, thereby forming the seal.

14. The input assembly according to claim 13, wherein the lip extends around a perimeter of the window frame and the channel extends around a perimeter of the keypad.

15. The input assembly according to claim 12, further comprising a retainer device which retains the insert in the housing.

16. The input assembly according to claim 15, wherein the retainer device comprises a rib on the housing which snap engages with the insert upon insertion of the insert into the housing.

17. The input assembly according to claim 12, further comprising a guiding device which guides the insert into a predetermined orientation in the housing upon insertion of the insert into the housing.

18. The input assembly according to claim 17, wherein the guiding device comprises a protrusion on the insert which interacts with a guiding device in the housing.

19. The input assembly according to claim 12, wherein the insert comprises an elongated body having a first body portion and a second body portion; and the compression surface is on the first body portion.

20. The input assembly according to claim 19, further comprising a ramp surface on the first body portion, the ramp surface being configured to engage the keypad and facilitate sliding of the first body portion under the keypad upon insertion of the insert into the housing.

21. The input assembly according to claim 12, further comprising a handlebar and a plurality of crush ribs on a second body portion, the plurality of crush ribs being configured to crush when the input assembly is coupled to the handlebar thereby frictionally engaging the input assembly with the handlebar.

22. The input assembly according to claim 12, further comprising a handlebar; wherein the housing is fastened to an end of the handlebar by a fastener which extends through the housing and the insert.

23. The input assembly according to claim 12, wherein the housing provides a handlebar extending between the open end and the closed end and through which the keypad window is formed.

* * * * *